(12) United States Patent
Fisch

(10) Patent No.: US 12,270,485 B2
(45) Date of Patent: Apr. 8, 2025

(54) FLUID VALVE HAVING A MAGNETIC DRIVE UNIT

(71) Applicant: AVS, Ingenieur J.C. Römer GmbH, Grafenau (DE)

(72) Inventor: Rainer Fisch, Hauzenberg (DE)

(73) Assignee: AVS, Ingenieur J.C. Römer GmbH, Grafenau (DE)

( * ) Notice: Subject to any disclaimer, the term of this patent is extended or adjusted under 35 U.S.C. 154(b) by 55 days.

(21) Appl. No.: 18/145,751

(22) Filed: Dec. 22, 2022

(65) Prior Publication Data

US 2023/0204120 A1 Jun. 29, 2023

(30) Foreign Application Priority Data

Dec. 23, 2021 (EP) ..................................... 21217230

(51) Int. Cl.
*F16K 27/02* (2006.01)
*F16K 27/04* (2006.01)
*F16K 31/06* (2006.01)

(52) U.S. Cl.
CPC ........ *F16K 31/0682* (2013.01); *F16K 27/029* (2013.01); *F16K 27/048* (2013.01); *F16K 31/0627* (2013.01); *F16K 31/0675* (2013.01)

(58) Field of Classification Search
CPC .. F16K 27/029; F16K 27/048; F16K 31/0603; F16K 31/0627; F16K 31/0675; F16K 31/0682
See application file for complete search history.

(56) References Cited

U.S. PATENT DOCUMENTS

| | | | |
|---|---|---|---|
| 5,040,567 A * | 8/1991 | Nestler | F16K 31/0682 251/129.16 |
| 5,139,226 A * | 8/1992 | Baldwin | H01F 7/14 137/625.65 |
| 5,653,422 A * | 8/1997 | Pieloth | F16K 31/0682 137/596.17 |

(Continued)

FOREIGN PATENT DOCUMENTS

| | | |
|---|---|---|
| DE | 2426748 A1 | 12/1975 |
| DE | 10107115 A1 | 9/2002 |

(Continued)

OTHER PUBLICATIONS

Search Report mailed Jun. 29, 2022, issued in corresponding European Application No. 21217230.8, filed Dec. 23, 2021, 12 pages.

(Continued)

*Primary Examiner* — Matthew W Jellett
(74) *Attorney, Agent, or Firm* — Christensen O'Connor Johnson Kindness PLLC

(57) ABSTRACT

A fluid valve having a drive unit for a valve closing body is provided. The drive unit can have a core, an electric coil partially surrounding the core, and an armature movable by the energization of the coil and the resulting magnetic force, the drive unit having a main body on which a support for the coil, at least one insertion opening for the core and an armature support are provided, and the core inserted into the at least one insertion opening being fixed to the main body by an overmold in such a way that the core assumes a defined position relative to the armature support.

15 Claims, 4 Drawing Sheets

(56) References Cited

U.S. PATENT DOCUMENTS

| | | | | |
|---|---|---|---|---|
| 5,709,370 | A * | 1/1998 | Kah, Jr. | F16K 31/0682 |
| | | | | 251/129.15 |
| 5,762,097 | A * | 6/1998 | Hettinger | F16K 31/0682 |
| | | | | 251/129.03 |
| 5,983,941 | A * | 11/1999 | Fritz | F16K 31/0682 |
| | | | | 137/625.65 |
| 6,726,173 | B2 * | 4/2004 | Hettinger | F16K 31/0641 |
| | | | | 251/129.2 |
| 6,786,238 | B2 * | 9/2004 | Frisch | F16K 31/0682 |
| | | | | 137/625.65 |
| 8,757,588 | B2 * | 6/2014 | Scheibe | F16K 31/0658 |
| | | | | 251/129.16 |
| 9,631,737 | B2 * | 4/2017 | Brust | F16K 31/0682 |
| 10,024,448 | B2 * | 7/2018 | Watanabe | H01F 27/24 |
| 10,288,190 | B2 * | 5/2019 | Becker | F16K 27/029 |
| 10,522,278 | B2 * | 12/2019 | Beuschel | H01F 7/12 |
| 10,711,914 | B2 * | 7/2020 | Roether | F16K 1/225 |
| 10,935,153 | B2 * | 3/2021 | Williams | F16K 41/12 |
| 2002/0134957 | A1 * | 9/2002 | Paessler | F16K 31/0682 |
| | | | | 251/129.15 |

FOREIGN PATENT DOCUMENTS

| | | |
|---|---|---|
| DE | 102010055025 A1 | 6/2012 |
| DE | 102013220557 A1 | 4/2015 |
| EP | 1348862 A2 | 10/2003 |
| JP | H0320405 A | 1/1991 |
| JP | H08330130 A | 12/1996 |
| JP | 2736032 B2 | 4/1998 |
| JP | 2016044708 A | 4/2016 |

OTHER PUBLICATIONS

Office Action mailed Dec. 21, 2023, in corresponding Japanese application No. 2022-205172, filed Dec. 22, 2022, 9 pages.

* cited by examiner

FLUID VALVE HAVING A MAGNETIC DRIVE UNIT

CROSS-REFERENCE TO RELATED APPLICATION

This application claims priority to European Application Number 21217230.8, filed Dec. 23, 2021, the disclosure of which is hereby incorporated by reference.

FIELD

The present disclosure relates to a fluid valve having a magnetic drive unit by means of which a valve closing body can be moved.

BACKGROUND

Fluid valves having a magnetic drive are already known. In particular, fluid valves are known in which an armature is linearly moved, i.e., shifted, by applying a magnetic field. This linear movement is converted into a pivoting movement of a valve closing body. Depending on the pivoting movement of the valve closing body, a fluid channel in the fluid valve is released or closed.

A major disadvantage of known fluid valves is that their manufacture is complex and therefore expensive. In addition, at least one end position of the armature must be calibrated by adjusting a stop in order to achieve a defined closing behavior of the valve.

This additionally increases the cost of the fluid valve.

SUMMARY

Based on this, an object of the present disclosure is to provide a fluid valve that can be manufactured at low cost and offers a defined switching or closing behavior without the need for a final adjustment.

This object is achieved by a fluid valve comprising the features of independent claim 1. Embodiments of the fluid valve are the subject matter of the subclaims. A method for manufacturing a fluid valve is the subject matter of further independent claim 15.

According to one aspect, a fluid valve comprising a drive unit for a valve closing body is disclosed. The drive unit comprises a core, an electric coil partially surrounding the core, and an armature movable by the energization of the coil and the resulting magnetic force. The armature is coupled to the valve closing body in such a way that a movement of the armature causes a movement, specifically a flap motion, of the valve closing body. The drive unit comprises a main body on which a support for the coil, at least one insertion opening for the core and an armature support are provided. The main body can form the supporting structure of the drive unit. The armature support is used to accommodate and mount the armature. The core introduced into the at least one insertion opening is fixed to the main body by means of an overmold in such a way that the core assumes a defined position relative to the armature support.

The technical advantage of the fluid valve is that, during the overmolding and thus during the fixation of the insertion position of the core in the main body, the position of the core relative to the armature support can be defined very precisely so that the manufacturing process of the fluid valve is simplified and, in addition, a readjustment of the position of the core relative to the armature can be avoided.

According to one exemplary embodiment, the core is secured against a shift relative to the main body by the overmold in such a way that the at least one pole face of the core assumes a predetermined position relative to the armature support. This ensures that the armature inserted into the armature support assumes a defined position relative to the at least one pole face and thus a defined force introduction into the armature or a defined switching behavior is achieved. In some embodiments, the position of the at least one pole face relative to the core is chosen in such a way that, in the energized state of the coil and thus when the armature has been moved towards the pole face, an air gap still remains between the armature and the pole face. The air gap can be chosen to be smaller than 1 mm, and in some embodiments smaller than 0.5 mm.

According to one exemplary embodiment, the overmold surrounds the core and the coil in a hood-like manner and establishes a connection with the main body. On the one hand, this ensures that the core and the coil are encapsulated by the overmold to protect them against external influences, and, on the other hand, a fixation of the core in the desired insertion position is achieved.

According to one exemplary embodiment, the core is U-shaped. As a result, a yoke-like or bracket-like core is formed which has a pair of pole faces. The two pole faces are here arranged at a distance from each other in a common plane. Thus, a closed magnetic circuit can be achieved by means of the armature.

According to one exemplary embodiment, the armature spans a pair of pole faces of the core and, when the coil is energized, the armature is pivotable about a pivot axis running perpendicularly to the longitudinal axis of the armature. In other words, the pivot axis runs parallel to a plane in which the pole faces of the core are arranged. In some embodiments, the pivot axis lies below the pair of pole faces that are arranged one above the other as viewed in the direction of the longitudinal axis of the armature. As a result, the armature can be pivoted relative to the plane of the pole faces, and the magnetic circuit can be closed when the coil is energized.

According to one exemplary embodiment, the armature is pivotable relative to the plane in which the pole faces of the core are arranged, namely in such a way that, in the energized state, the armature is pivoted into a first pivot position towards the pole faces and, when de-energized, is positioned in a second pivot position at which the longitudinal axis of the armature protrudes obliquely from the plane of the pole faces. The pivoting out of the plane can be performed by means of the spring force of a spring which is deformed when the coil is energized. In the first pivot position, the armature can be positioned a small distance, for example less than 1 mm, in particular less than 0.5 mm, from the pole faces, i.e., there is no direct abutment against the pole faces. In the first pivot position, the magnetic circuit is closed. In the second pivot position, the distance of the armature from the pole faces (in particular from the pole face furthest away) is at most 5 mm, in particular 4 mm, 3 mm or 2 mm, and in some embodiments 1 mm or less, for example 0.8 mm or substantially 0.8 mm. Due to the small stroke of the pivoting movement, a high force introduction into the armature and thus a high actuating force is generated.

According to one exemplary embodiment, the core is formed by a plurality of metallic flat material pieces which are arranged in a layered and congruent way. This allows the core to be manufactured at low cost compared to a core made in one piece.

According to one exemplary embodiment, the flat material pieces are punching sheet parts. The use of punching sheet parts also supports a cost-effective manufacture of the core.

According to one exemplary embodiment, the flat material pieces of the core abut against one another in an electrically conductive way. As a result, the core has electrical or magnetic properties similar to a core formed in one piece from a solid material.

According to one exemplary embodiment, the armature support comprises a bearing section for the armature at which the armature is pivotably mounted relative to the main body. This ensures that the armature can be pivoted towards the pole faces in the energized state and away from the pole faces in the de-energized state. This pivoting movement is transmitted to the valve closing body in such a way that the latter performs an opening or closing movement.

According to one exemplary embodiment, the bearing section is a plain bearing section (also denoted as slide bearing section) that forms a surface bearing for an armature bearing portion that has the shape of a circular arc. Thus, a simple structure of the drive unit is achieved since the bearing is realized by inserting the armature into the armature support.

According to one exemplary embodiment, the main body is formed by a plastics injection molded part. This plastics injection molded part here forms the base part of the drive unit. The use of a plastics injection molded part allows the main body to be manufactured at low cost.

According to one exemplary embodiment, the main body has a tubular insertion portion for the core, into which the core can be partially inserted. The insertion portion also forms the support to which the winding of the coil is applied on the outside. The main body thus forms a guide structure for the insertable core as well as the coil support. As a result, the manufacturing process of the drive unit of the fluid valve is decisively simplified and made more precise.

According to one exemplary embodiment, the main body includes insertion openings for metal contacts provided for the electrical contacting of the coil. This also allows the metal contacts to be fixed directly to the main body, which in turn simplifies and specifies the manufacturing process since the metal contacts are already fixed to the main body in the exact position even before the subsequent application of the plastics overmolding.

According to one exemplary embodiment, the armature support comprises a box-like shape with a bottom region and wall portions projecting therefrom. On the one hand, the armature support forms the receiving space for the armature, and, on the other hand, the armature support is used as an interface for fixing the valve housing or for mounting the valve closing body.

According to a further aspect, a method for manufacturing a fluid valve drive unit is disclosed. The method comprises the following steps:
  providing a main body and a core;
  winding an electrical conductor around the main body to form an electric coil;
  inserting the core into the main body;
  overmolding the core and the coil by means of an injection molding process in such a way that a partial connection of the resulting overmold to the main body is formed, wherein a defined insertion position of the core relative to an armature support provided on the main body is established by an injection-molding tool used in the injection molding process.

In the sense of the present disclosure, the expressions "approximately", "substantially," or "about" mean deviations from the respective exact value by +/−5-10% and/or deviations in the form of changes that are insignificant for the function.

Further embodiments, advantages and possible applications of the present disclosure also result from the following description of exemplary embodiments and from the drawings. In this connection, all the features described and/or illustrated are in principle the subject matter of the present disclosure, either individually or in any combination, irrespective of their summary in the claims or their back-reference. Also, the contents of the claims are made a part of the description.

BRIEF DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
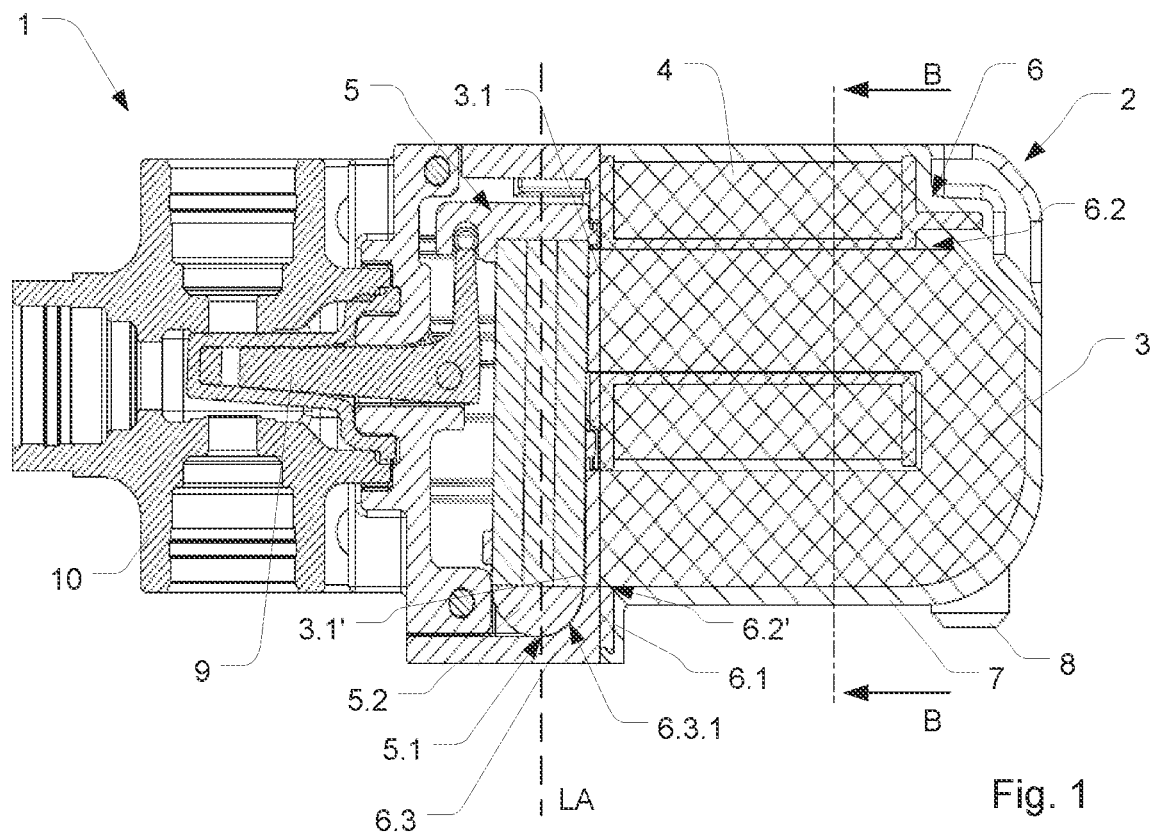
FIG. 1 shows, by way of example, a longitudinal section through a fluid valve along the sectional plane A-A shown in FIG. 2.
Figure 2:
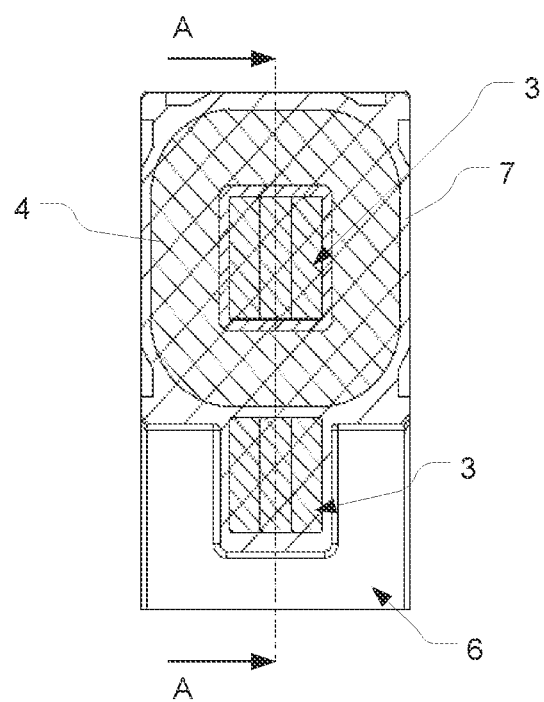
FIG. 2 shows, by way of example, a section through a drive unit of the fluid valve along the sectional plane B-B illustrated in FIG. 1.
Figure 3:
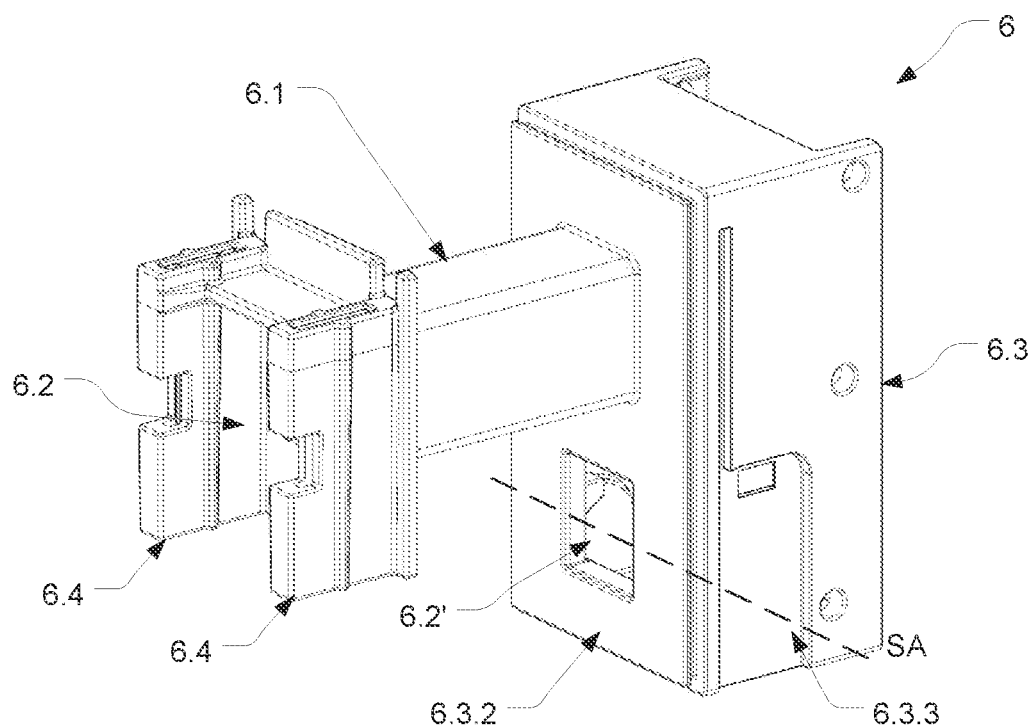
FIG. 3 shows, by way of example, a perspective view of a main body of the drive unit of the fluid valve.
Figure 4:
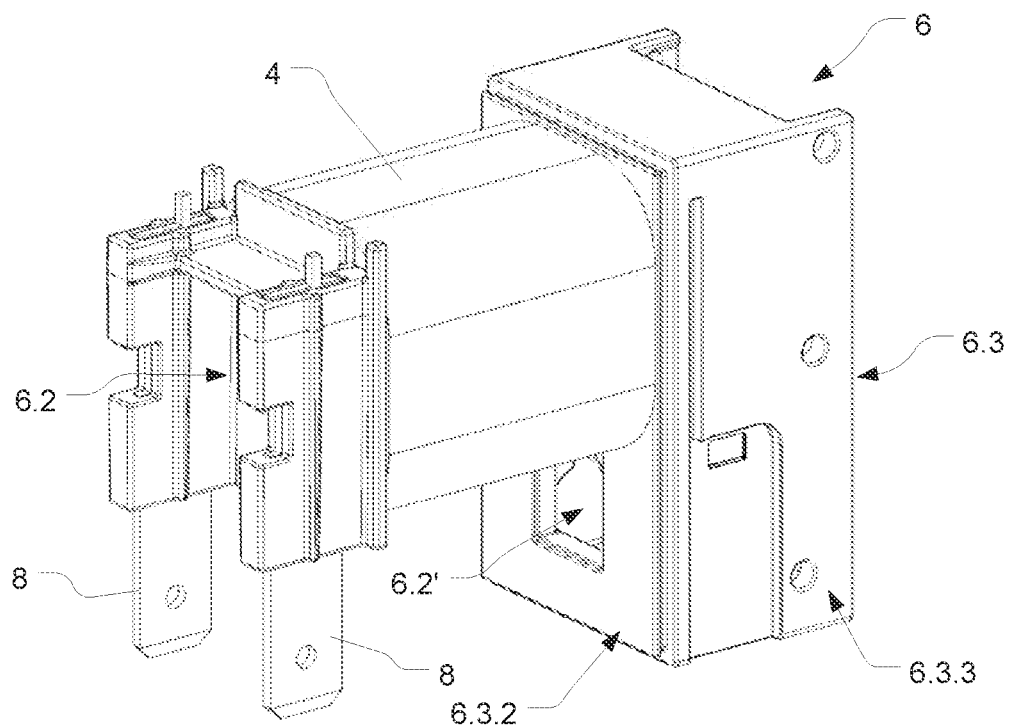
FIG. 4 shows, by way of example, a perspective view of the main body of the drive unit of the fluid valve with coil and contact elements provided thereon.

FIGS. 1 and 2 each show a sectional view of a fluid valve 1, FIG. 1 showing a longitudinal sectional view centrally through the fluid valve, as indicated by sectional line A-A in FIG. 2, and FIG. 2 showing a sectional view running perpendicularly thereto in the transverse direction of the fluid valve 1 along sectional line B-B as shown in FIG. 1.

The fluid valve 1 comprises a drive unit 2 for a valve closing body 9 and a valve housing 10, in which at least one fluid channel is provided. The valve closing body 9 extends into the valve housing 10 and is coupled to the drive unit 2 in such a way that the valve closing body 9 can be moved, in particular pivoted, by the drive unit. In particular, the valve closing body 9 can assume a first and a second pivot position in order to release or close a valve opening depending on the pivot position. In the illustrated exemplary embodiment, the valve housing 10 has three ports, one pair of ports being fluidly connected to one another in each case depending on the pivot position of the valve closing body 9. Differing therefrom, however, the fluid valve 1 can also have only two ports, a fluidic connection between the ports being released or not depending on the pivot position of the valve closing body 9.

The fluid valve 1 has the following functionality: the drive unit 2 is designed to influence the pivot position of an armature 5. The drive unit 2 is an electromagnetic drive unit, i.e., when a coil 4 of the drive unit is energized, a magnetic force is generated by means of which the armature 5 is moved from a second pivot position to a first pivot position. This first pivot position is shown in FIG. 1. This first pivot position is held as long as the coil 4 is energized. The armature 5 can be spring-loaded by means of a spring in such a way that it is moved back to the second pivot position after the flow of electric current through the coil 4 has ended.

As shown in FIG. 1, the valve closing body 9 is coupled to the armature 5 in such a way that the valve closing body 9 is moved, in particular pivoted, by the armature 5. In particular, the valve closing body 9 assumes a first or second position in the valve housing 10 depending on the pivot position of the armature 5 and thus defines the valve position, i.e., the release or closing of a fluid channel.

The structure of the drive unit 2 of the fluid valve 1 is described in more detail below.

The drive unit 2 comprises a main body 6. The main body 6 forms the supporting basic structure of the drive unit 2. It can be designed as an injection-molded part, in particular as a plastics injection-molded part. The main body 6 has a tubular or substantially tubular support 6.1 for the coil 4. A first insertion opening 6.2 is formed inside the support 6.1, into which a leg of a U-shaped core 3 can be inserted, as indicated in FIG. 5.

The main body 6 further comprises an armature support 6.3. This armature support 6.3 directly borders on the support 6.1 and is designed to pivotably receive the armature 5. The armature support 6.3 is formed in a box-like, in particular in a rectangular box-like, fashion and has a bottom region 6.3.2 and a plurality of wall regions 6.3.3. The wall regions 6.3.3 are connected to the bottom region, surround the bottom region 6.3.2 circumferentially and project from the bottom region 6.3.2 on the side facing away from the support 6.1.

Figure 5:
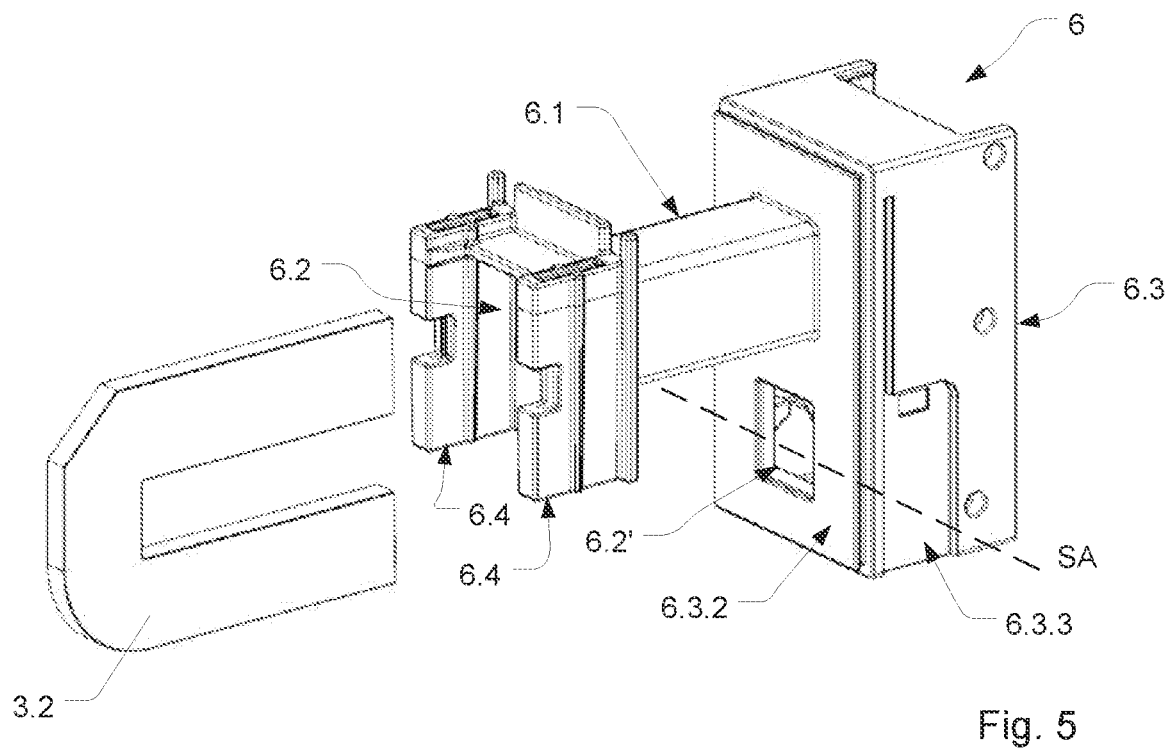
FIG. 5 shows, by way of example, a perspective view of the drive unit of the main body of the fluid valve with a piece of flat material or core sheet to be inserted thereinto, which forms part of the layered core.
Figure 6:
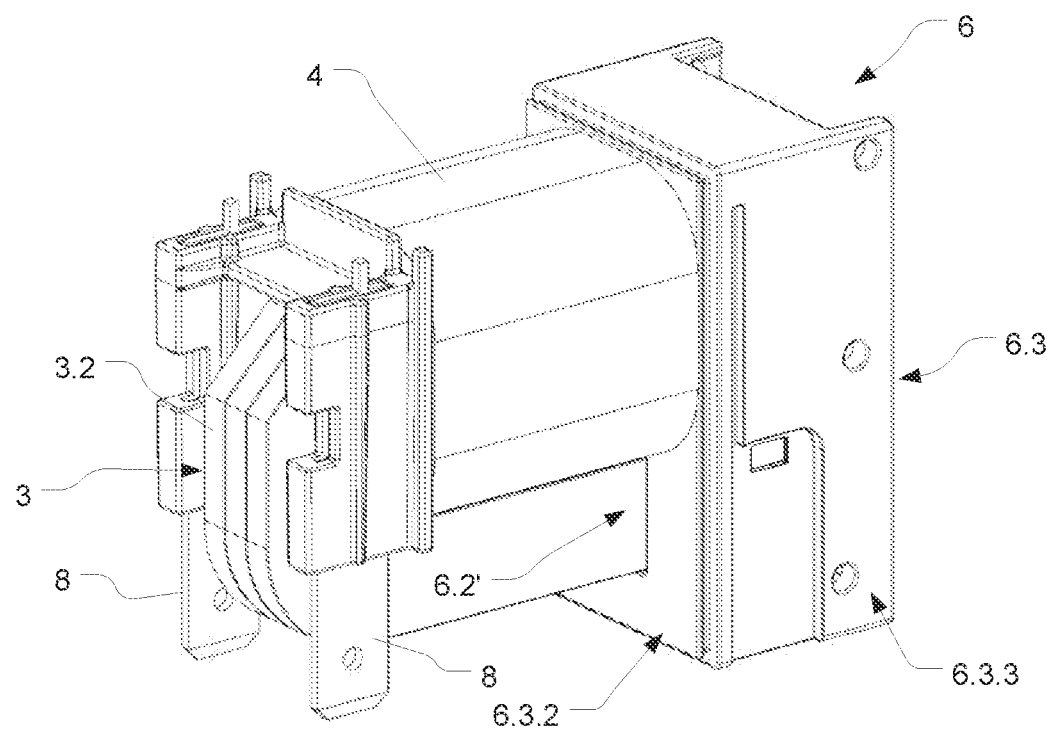
FIG. 6 shows, by way of example, a perspective view of the main body of the drive unit of the fluid valve with coil and contact elements provided thereon as well as inserted core sheets.

A second insertion opening 6.2' is provided in the bottom region 6.3.2, into which opening a second leg of a U-shaped core 3 can be inserted, as indicated in FIG. 5. The U-shaped core 3 is thus yoke-shaped, one leg of the core being surrounded by the coil 4 so that, when the coil 4 is energized, a closed magnetic circuit is formed by the core 3 and the armature 5 spanning the pole faces 3.1, 3.1' of the core 3.

On the side of the support 6.1 facing away from the armature support 6.3, the main body 6 has insertion openings for metal contacts 8. The metal contacts 8 can be interlockingly inserted into these insertion openings. They are shown in FIGS. 1 and 4 to 6. The metal contacts 8 are used for electrically contacting the coil 4.

In the illustrated exemplary embodiment, the core 3 is formed from a plurality of layered flat material pieces 3.2. The flat material pieces 3.2 are in particular punched parts made of a metallic flat material, in particular a metal sheet. In order to form the core 3, they are placed with their flat sides on top of one another in congruent fashion so that a stack with a plurality of flat material pieces 3.2 is formed, which in this arrangement forms the core 3 (so-called layered core). Here, the individual flat material pieces 3.2 are in direct and electrically conductive contact with one another so that the layered core has the same or substantially the same electrical properties as a core formed in one piece. As a result, the cost of manufacturing the core 3 can be substantially reduced.

In some embodiments, the armature 5 also includes a stack of multiple layered flat material pieces, which are hereinafter referred to as armature plates. In particular, the armature plates are punched parts made from a metallic flat material, in particular a metal sheet. In order to form the armature 5, the flat sides thereof are placed one on top of the other in a congruent fashion so as to form a stack with a plurality of armature plates (so-called layered armature). Here, the individual armature plates directly abut in an electrically conductive way against one another so that the layered armature 5 has the same or substantially the same electrical properties as an armature formed in one piece. As a result, the cost of manufacturing the armature 5 can be substantially reduced.

In an embodiment, the armature 5 comprises an armature carrier 5.2. The armature carrier 5.2 at least partially surrounds the stack of layered armature plates and fixes them relative to one another. The armature carrier 5.2 can be an injection-molded part, in particular a plastics injection-molded part.

At a free end of the armature 5, the armature carrier 5.2 comprises a bearing portion 5.1. By means of this bearing portion 5.1, the armature 5 is pivotably mounted in the armature support 6.3 of the main body 6.

On the outer circumference, the bearing portion 5.1 comprises a sliding surface of circular arc shape in cross-section so that a plain bearing section is formed. The sliding surface is in interlocking contact with a concave bearing section 6.3.1 of the armature support 6.3, which is shaped inversely to the bearing portion 5.1. As a result, the armature 5 can be pivoted about a pivot axis SA which runs parallel to a plane in which the pole faces 3.1, 3.1' of the core are arranged, or which (pivot axis SA) runs perpendicularly to the longitudinal axis LA of the armature 5. This allows the armature 5 to be pivoted towards and away from the upper pole face 3.1 shown in FIG. 1.

In order to be able to apply a high magnetic force to the armature 5 and to be able to achieve a reproducible switching operation of the fluid valve 1 without readjustment or adjusting work after the manufacturing process, it is advantageous to position the core 3 as precisely as possible within the main body 6. In particular, it is advantageous to determine the insertion position of the core 3 into the main body 6 as precisely and reproducibly as possible during the manufacturing process since this determines the position of the pole faces 3.1, 3.1' relative to the bearing section 6.3.1 of the armature support 6.3 and thus also to the armature 5.

In order to fix the core 3 or the flat material pieces 3.2 forming the core 3 relative to the main body 6, the part of the main body 6 projecting from the armature support 6.3 together with the inserted core 3 and the coil 4 is at least partially overmolded. On the one hand, this fixes the insertion position of the core 3 or the flat material piece 3.2 forming the core 3 relative to the main body 6, and, one the other hand, the core 3 or the coil 4 is accommodated in electrically insulating fashion.

In some embodiments, the insertion position of the core 3 is adjusted in such a way that the armature support 6.3 and the pole faces 3.1, 3.1' come into abutment against abutment areas of the injection-molding tool used for the overmolding. In this way, a reproducible insertion position of the core 3 in the main body 6 and thus an exact adjustment of the position of the pole faces 3.1, 3.1' relative to the bearing section 6.3.1 of the armature support 6.3 is achieved.

Figure 7:
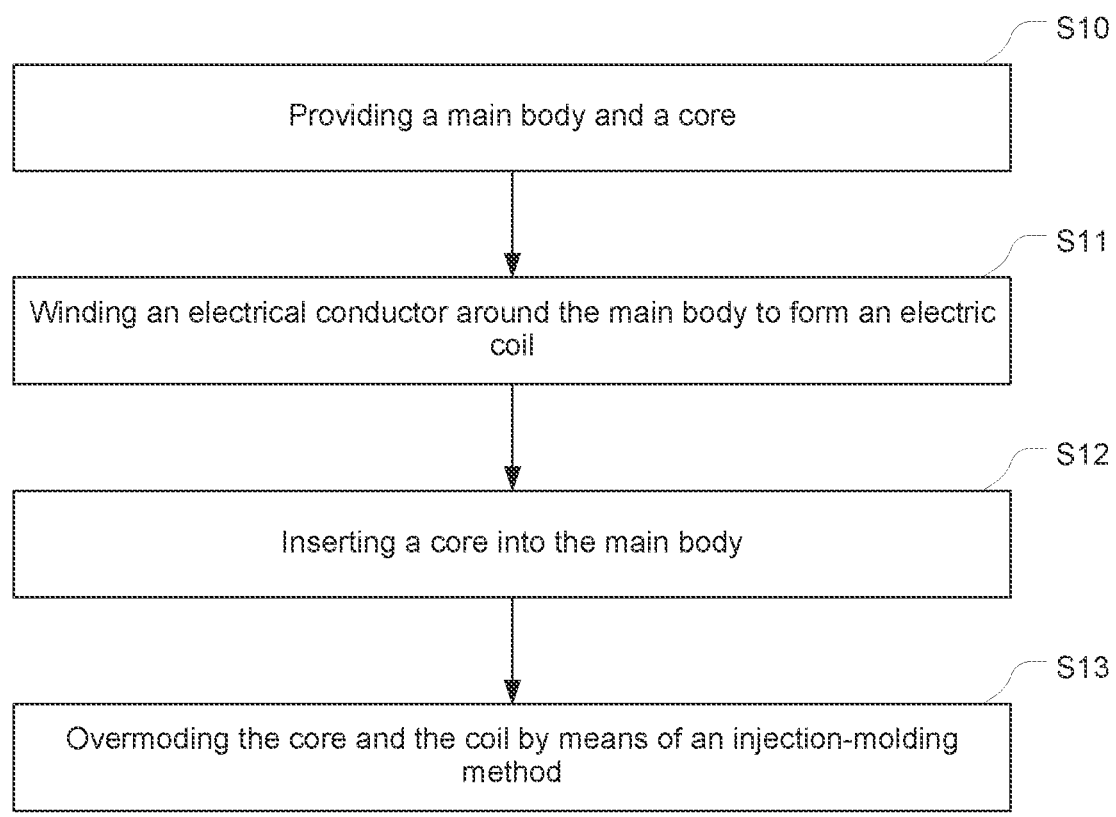
FIG. 7 shows, by way of example, a block diagram illustrating the steps for manufacturing a drive unit for a fluid valve.

In the following, the steps of the method for manufacturing the fluid valve 1 are described on the basis of the flow chart according to FIG. 7.

First, a main body 6 and a core 3 are provided (S10). In case that the core 3 is formed from a plurality of flat material pieces 3.2, these flat material pieces 3.2 are provided.

Then, an electrical conductor is wound around the support 6.1 of the main body 6 to produce an electric coil 4 on the main body 6 (S11).

After the coil 4 is produced, the core 3 is inserted into the main body 6 (S12). Here, the core is inserted from the side facing away from the armature support 6.3 into the at least one insertion opening 6.2, 6.2' formed on the main body 6. In some embodiments, a plurality of flat material pieces 3.2 forming the core 3 are inserted into the main body 6 in such a way that they come to lie next to one another in a stacked and congruent manner.

After the insertion of the core 3 or the flat material pieces 3.2 forming the core 3, the core 3 and the coil 4 are overmolded by means of an injection molding process (S13). This forms a partial connection between the overmold 7 formed by the injection molding process and the main body 6, thereby permanently fixing the insertion position of the core 3 in the main body 6. During the injection molding process, an injection-molding tool is used which is designed so as to establish a defined insertion position of the core 3 relative to the armature support 6.3 provided on the main body 6. In particular, the injection-molding tool has a defined abutment surface for the armature support 6.3 of the main body 6 and an abutment surface for the pole faces 3.1, 3.1' of the core 3 so that, due to the injection-molding tool, the core 3 always assumes a defined position relative to the armature support 6.3 or the bearing section 6.3.1 of the armature formed thereon.

The present disclosure has been described above by means of exemplary embodiments. It is understood that numerous variations as well as modifications are possible without leaving the scope of protection defined by the claims.

LIST OF REFERENCE SIGNS 1 fluid valve
2 drive unit
3 core
3.1, 3.1' pole face
3.2 flat material piece
4 coil
5 armature
5.1 bearing portion
5.2 armature carrier
6 main body
6.1 support
6.2 first insertion opening
6.2' second insertion opening
6.3 armature support
6.3.1 bearing section
6.3.2 bottom region
6.3.3 wall portion
6.4 insertion opening
7 overmold
8 metal contact
9 valve closing body
10 valve housing
LA longitudinal axis of the armature
SA pivot axis of the armature In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fluid valve, comprising:
a drive unit for a valve closing body, having:
   a core;
   an electric coil partially surrounding the core;
   an armature which can be moved by the energization of the electric coil and a resulting magnetic force thereof; and
   a main body having a coil support for the electric coil, at least one insertion opening for the core, and an armature support,
wherein the core, when inserted into the at least one insertion opening, is fixed to the main body by an overmold such that the core has a defined position relative to the armature support, and
wherein the overmold is coupled to the main body such that the overmold fixes the insertion position of the core in the main body.

2. The fluid valve of claim 1, wherein the core is secured against shifting relative to the main body by the overmold such that at least one pole face of the core has a predetermined position relative to the armature support.

3. The fluid valve of claim 1, wherein the overmold surrounds the core and the electric coil and establishes a connection to the main body.

4. The fluid valve of claim 1, wherein the core is U-shaped.

5. The fluid valve of claim 1, wherein the armature spans a pair of pole faces of the core and due to the energization of the electric coil the armature is pivotable about a pivot axis extending perpendicularly to a longitudinal axis of the armature.

6. The fluid valve of claim 1, wherein the core is formed by a plurality of metallic flat material pieces arranged in a layered and congruent fashion.

7. The fluid valve of claim 6, wherein the metallic flat material pieces are punched sheet metal parts.

8. The fluid valve of claim 6, wherein the metallic flat material pieces of the core are in abutment against one another in an electrically conductive manner.

9. The fluid valve of claim 1, wherein the armature support comprises a bearing section for the armature, at which the armature is pivotably mounted relative to the main body.

10. The fluid valve of claim 9, wherein the bearing section is a plain bearing section which forms a surface bearing for a bearing portion of the armature that has the shape of a circular arc.

11. The fluid valve of claim 1, wherein the main body is formed by a plastics injection molded part.

12. The fluid valve of claim 1, wherein the main body comprises a tubular insertion portion for the core, into which the core can be partially inserted, the insertion portion also forming the coil support to which a winding of the electric coil is applied.

13. The fluid valve of claim 1, wherein the main body comprises insertion openings for metal contacts which are provided for electrically contacting the electric coil.

14. The fluid valve of claim 1, wherein the armature support has a partial box shape with a bottom region and wall portions projecting therefrom.

15. A method for manufacturing a fluid valve drive unit, the method comprising:
providing a main body and a core;
winding an electrical conductor around the main body to form an electric coil;
inserting the core into the main body; and
overmolding the core and the electric coil by an injection molding process so as to form a partial connection of the resulting overmold to the main body, wherein the overmold is coupled to the main body such that the overmold fixes the insertion position of the core in the main body,
wherein a defined insertion position of the core relative to an armature support provided on the main body is established by an injection-molding tool used during injection molding.

* * * * *